(12) United States Patent
Arima

(10) Patent No.: US 6,217,204 B1
(45) Date of Patent: *Apr. 17, 2001

(54) OPTICAL FIBER ASSEMBLY AND LIGHT AMPLIFICATION COUPLER HAVING RARE EARTH DOPED LIGHT AMPLIFICATION MEDIUM AND RELATED METHOD OF MAKING

(75) Inventor: Tadao Arima, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,607

(22) Filed: Jun. 20, 1997

(30) Foreign Application Priority Data

Jan. 8, 1997 (JP) .................................................. 9-001521

(51) Int. Cl.[7] ......................................................... F21V 8/00
(52) U.S. Cl. .......................... 362/551; 362/554; 362/556; 385/142
(58) Field of Search ..................... 362/551, 554, 362/556; 385/115, 20, 21, 22, 142; 359/141

(56) References Cited

U.S. PATENT DOCUMENTS

| 4,787,927 | * | 11/1988 | Mears et al. ............................. 65/390 |
| 4,826,288 | * | 5/1989 | Mansfield et al. ...................... 65/390 |
| 5,109,461 | * | 4/1992 | Churchill .............................. 385/115 |
| 5,406,641 | * | 4/1995 | Bigley, Jr. et al. ................... 385/141 |
| 5,751,870 | * | 5/1998 | Forkner et al. ........................ 385/33 |
| 5,980,075 | * | 11/1999 | Sheaffer ............................... 362/556 |
| 6,036,329 | * | 3/1999 | Iimura .................................... 362/31 |

OTHER PUBLICATIONS

"Theory and Fabrication of 4×4 Single–Mode Fused Optical Fiber Couplers", Jan. 20, 1990, vol. 29, No. 3, Applied Optics, pp. 371–374.

* cited by examiner

*Primary Examiner*—Alan Cariaso
*Assistant Examiner*—Ronald E. DelGizzi
(74) *Attorney, Agent, or Firm*—Staas & Halsey, LLP

(57) ABSTRACT

A light amplification coupler includes a glass pipe, a first optical fiber having, at one end thereof, an input port to which signal light is inputted and having an output port at the other end thereof, the first optical fiber having an intermediate portion inserted in the glass pipe, a second optical fiber having one end portion adapted to receive pump light, the second optical fiber being inserted in the glass pipe and fused to the first optical fiber, and a third optical fiber having an output port at one end thereof, the other end of the third optical fiber being inserted in the glass pipe from the output port side of the first optical fiber and fused to the first and second optical fibers. The light amplification coupler further includes a rare earth doped light amplification medium fused to all of the glass pipe and the first, second and third optical fibers in such a manner as to cover the first, second and third optical fibers fused in the glass pipe, and a pump light source for inputting pump light to the one end portion of the second optical fiber.

26 Claims, 8 Drawing Sheets

OPTICAL FIBER ASSEMBLY AND LIGHT AMPLIFICATION COUPLER HAVING RARE EARTH DOPED LIGHT AMPLIFICATION MEDIUM AND RELATED METHOD OF MAKING

BACKGROUND OF THE INVENTION

1. Field of the Invention

This invention relates to a light amplification coupler which amplifies signal light and simultaneously branches it into a plurality of signal light beams.

2. Description of the Related Art

In an optical subscriber type system, it is increasing to distribute signal light of a CATV (cable television) or the like into a large number of light beams to transmit the same to individual subscribers. In such transmission, since the signal light intensity decreases as the signal light is distributed, the signal light is amplified by an optical amplifier first and then distributed using a multiple-branching coupler. Several types of optical amplifiers by which an optical signal is amplified directly are known. Of the known optical amplifiers, an optical fiber amplifier wherein a rare earth doped fiber is combined with pump light is used very frequently in recent years because it has such superior characteristics that it is free from a polarization dependency, that it is low in noise and that it exhibits a low coupling loss with a transmission line. Employment of optical fiber amplifiers allows a remarkable increase in transmission repeating distance in an optical fiber transmission system and distribution of an optical signal to a large number of signal light beams.

Referring to FIG. 1, there is shown a schematic view of a conventional signal light distribution system. Signal light is inputted to an input port 3 of an optical fiber 2. The signal light propagates in the optical fiber 2 and is inputted to an optical multiplexer 6. Meanwhile, also pump light from a pumping laser diode 4 is inputted to the optical multiplexer 6, and the signal light and the pump light are multiplexed by the optical multiplexer 6. The multiplexed signal light and pump light propagate in an Er doped fiber 8 which includes a core doped with Er. During the propagation, the signal light is amplified along the Er doped fiber by a well known principle. The amplified signal light is supplied to an optical filter 10, by which amplified spontaneous emission light (ASE light) and a remaining component of the pump light are removed therefrom. Thereafter, the signal light is branched into a large number of light beams by a branching coupler 12, and the branched signal light beams thereafter propagate in optical fibers 14a to 14e.

In this manner, in the conventional optical signal distribution system, an optical signal is first amplified by an Er doped fiber, and then the signal light is distributed into a large number of signal light beams using a branching coupler. For the branching coupler, a fusion type coupler formed from a plurality of optical fibers fused to each other or a waveguide type coupler is used. However, since an existing amplifier and an existing branching coupler are used in combination, this makes a factor of making reduction in cost and space difficult.

Further, an optical multiplexer for multiplexing signal light and pump light must be provided, and a construction for splicing a plurality of optical fibers and another construction for optically coupling the optical fibers by means of an optical prism is required. Further, the optical amplifier must be assembled by individually joining filters for removing ASE light which makes noise.

SUMMARY OF THE INVENTION

It is therefore an object of the present invention to provide a light amplification coupler which can amplify signal light and simultaneously distribute it into a large number of signal light beams.

It is another object of the present invention to provide a method of producing a light amplification coupler.

In accordance with an aspect of the present invention, there is provided an optical fiber assembly, comprising a glass pipe, a plurality of optical fibers inserted in the glass pipe and fused to each other, and a rare earth doped light amplification medium fused to both of the glass pipe and the fused optical fibers in such a manner as to cover an outer periphery of the optical fibers fused in the glass pipe.

The rare earth doped light amplification medium contains one of elements of Er, Nd, Pr and Tm. Preferably, the rare earth doped light amplification medium contains Er and B and has a refractive index lower than that of clads of the plurality of optical fibers.

In accordance with another aspect of the present invention, there is provided a light amplification coupler, comprising a glass pipe, a first optical fiber having, at one end thereof, an input port to which signal light is inputted and having an output port at the other end thereof, the first optical fiber having an intermediate portion inserted in the glass pipe, a second optical fiber having one end portion adapted to receive pump light, the second optical fiber being inserted in the glass pipe and fused to the first optical fiber, a third optical fiber having an output port at one end thereof, the other end of the third optical fiber being inserted in the glass pipe from the output port side of the first optical fiber and fused to the first and second optical fibers, and a rare earth doped light amplification medium fused to all of the glass pipe and the first, second and third optical fibers in such a manner as to cover the first, second and third optical fibers fused in the glass pipe.

Preferably, the rare earth doped light amplification medium contains Er and B and has a refractive index lower than that of clads of the first to third optical fibers. Further preferably, the light amplification coupler further comprises a glass film doped with F interposed between the glass pipe and the rare earth doped light amplification medium.

The third optical fiber is composed of a plurality of optical fibers, and the second optical fiber is disposed at the center of the first optical fiber and the plurality of third optical fibers. Further, each of the output ports of the first optical fiber and the third optical fibers has an optical filter for removing ASE optical and a remaining component of pump light.

In accordance with a further aspect of the present invention, there is provided a method of producing an optical fiber assembly, comprising the steps of forming a rare earth doped light amplification medium quartz glass film on an inner surface of a quartz glass pipe, partially removing coatings of a plurality of optical fibers individually, inserting the plurality of optical fibers into the quartz glass pipe such that the portions of the plurality of optical fibers from which the coatings have been removed may be positioned in the quartz glass pipe, and heating and drawing the plurality of optical fibers together with the quartz glass pipe to fuse the plurality of the optical fibers and the quartz glass pipe to each other and covering an outer periphery of the plurality of optical fibers with a fused rare earth doped light amplification medium.

As another method of producing an optical fiber assembly, alkylsilicate glass liquid doped with a rare earth element may be filled into the quartz glass pipe, whereafter the alkylsilicate glass liquid is heated so as to be vitrified.

The above and other objects, features and advantages of the present invention and the manner of realizing them will become more apparent, and the invention itself will best be understood, from a study of the following description and appended claims with reference to the attached drawings showing some preferred embodiments of the invention.

DESCRIPTION OF THE PREFERRED EMBODIMENTS

Figure 1:
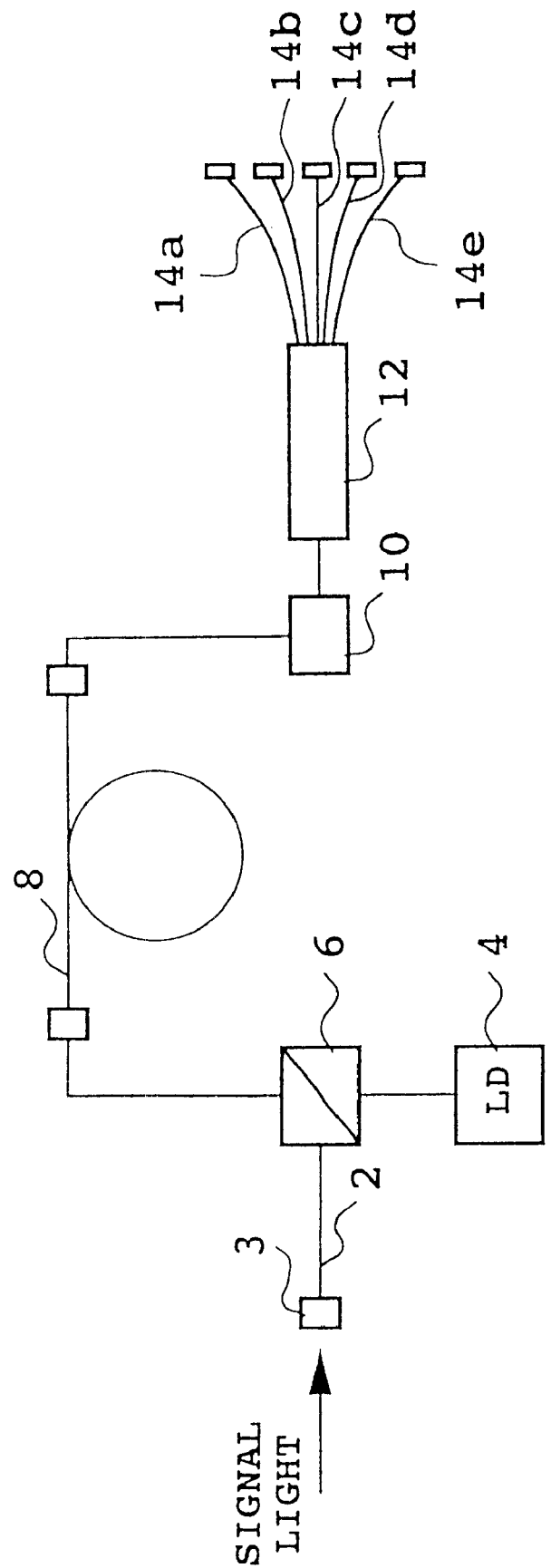
FIG. 1 is a schematic view showing a construction of a conventional signal light distribution system.
Figure 2:
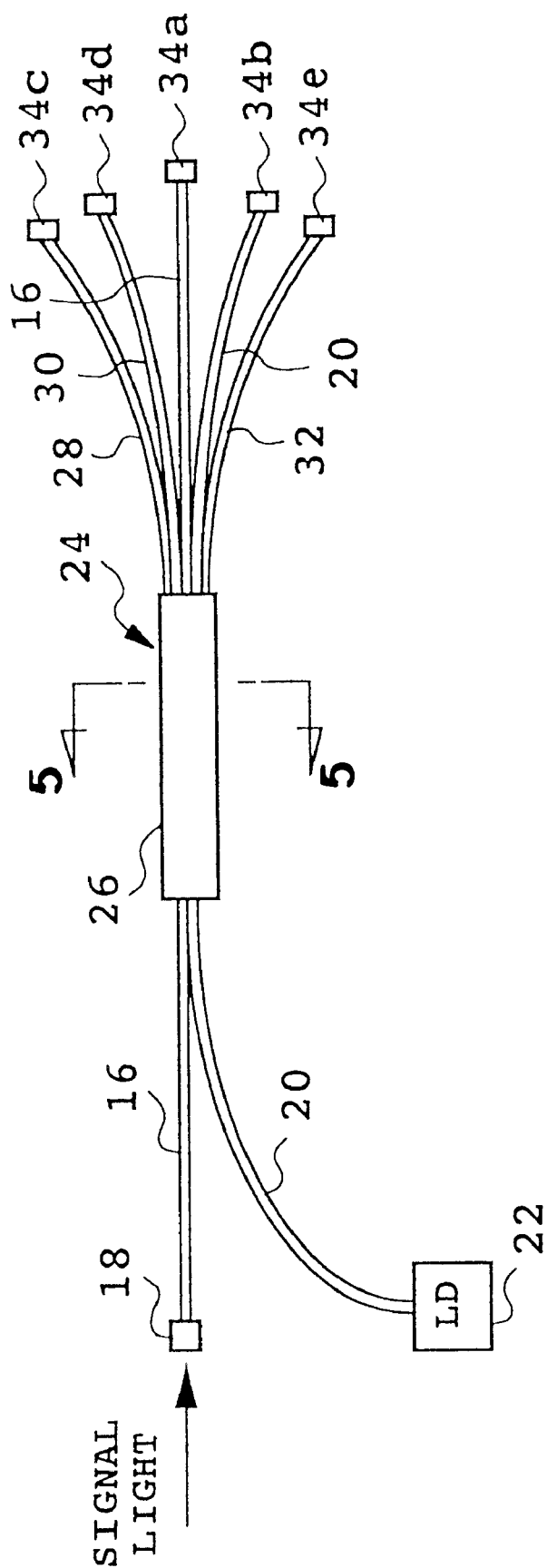
FIG. 2 is a schematic view of a light amplification coupler of a first embodiment of the present invention.

A light amplification coupler of a first embodiment of the present invention is described with reference to FIGS. 2 to 7. The present embodiment is an embodiment wherein five single mode optical fibers are fused to each other and signal light is branched into five signal light beams. It is to be noted that, in the description of the present specification, each optical fiber is a single mode optical fiber in principle. FIG. 2 shows a side elevational view of the light amplification coupler 24 of the first embodiment. An optical fiber 16 for signal light transmission and another optical fiber 20 for pump light transmission have coatings which are removed from intermediate portions of the optical fibers 16 and 20, and the optical fibers 16 and 20 extend through a quartz glass pipe 26 such that the portions thereof from which the coatings are removed may be positioned in the quartz glass pipe 26.

An input port 18 of the optical fiber 16 is adapted to receive signal light, and a pumping laser diode 22 is connected to an end of the optical fiber 20. Here, while the output port of the optical fiber 20 is used also as a branch output for signal light, since pump light has a high power, it is better not to use the output port of the optical fiber 20 as an output port of the light amplification coupler 24. If the output port of the optical fiber 20 is used as an output port of the light amplification coupler 24, then a filter for cutting the wavelength of the pump light must be provided there. From the right side of the quartz glass pipe 26, three optical fibers 28, 30 and 32 whose coatings are removed from end portions of them are inserted in the quartz glass pipe 26, and as hereinafter described in detail, the five optical fibers 16, 20, 28, 30 and 32 are fused to each other by heating and drawing the optical fibers 16, 20, 28 30 and 32 together with the quartz glass pipe 26. The right ends of the optical fibers 16, 20, 28, 30 and 32 are connected to output ports 34a, 34b, 34c, 34d and 34e, respectively.

In the following, a production method for the light amplification coupler 24 of the present embodiment is described in detail. First, a quartz glass film 36 doped with F was formed by a CVD chemical vapor deposition method on an inner surface of a quartz glass pipe 26 having an inner diameter of approximately 10 mm, and a glass soot doped with $B_2O_3$ was deposited on an inner surface of the quartz glass film 36, whereafter the quartz glass pipe 26 was impregnated with an Er chloride ethanol solution and then heated to vitrify the glass soot with Er chloride ethanol solution to form a quartz glass film 38. The quartz glass pipe 26 was drawn while being heated at approximately 1,500° C. to 1,600° C. to reduce the diameter thereof until the inner diameter became approximately 600 $\mu$m. The outer diameter of the quartz glass pipe 26 then was approximately 2 mm.

Figure 3:
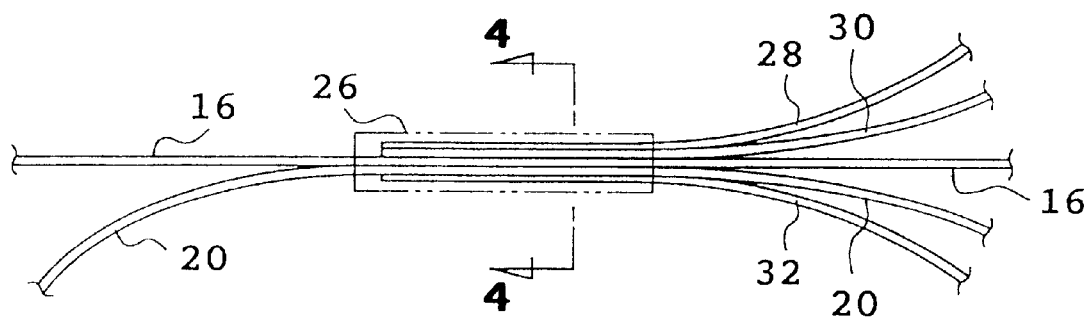
FIG. 3 is a schematic view illustrating a manner in which optical fibers are inserted in a quartz glass pipe.
Figure 4:
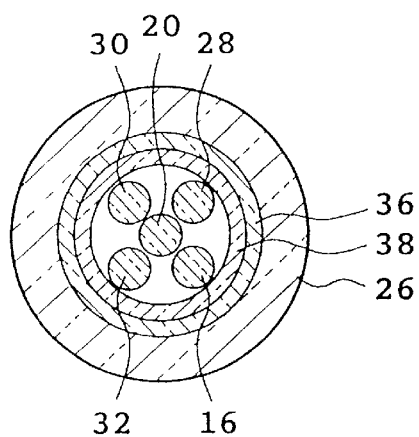
FIG. 4 is a sectional view taken along line 4—4 of FIG. 3.

An optical fiber 16 for signal light and another optical fiber 20 for pump light whose coatings were removed from intermediate portions of them were passed through the quartz glass pipe 26 so that the coating removed portions thereof might be positioned in the quartz glass pipe 26, and from one end of the quartz glass pipe 26, three optical fibers 28, 30 and 32 whose coatings were removed from end portions of them were inserted into the quartz glass pipe 26 so that the coating removed portions thereof might be positioned in the quartz glass pipe 26. A manner in which the optical fibers 16, 20, 28, 30 and 32 are inserted in the quartz glass pipe 26 is illustrated in FIG. 3, and a sectional view of them is shown in FIG. 4.

While the quartz glass pipe 26 was heated to approximately 1,500° C. to 1,600° C. from the outside by means of a gas burner, the opposite end portions of the quartz glass pipe 26 were drawn in the opposite directions to each other to extend the quartz glass pipe 26 and to reduce the inner diameter of the pipe to contact the optical fibers 16, 20, 28, 30 and 32 closely with each other. The mutually fused optical fibers 16, 20, 28, 30 and 32 were further drawn together with the quartz glass pipe 26 while being heated to reduce the diameters of them to couple them to each other, thereby completing the light amplification coupler 24.

Figure 5:
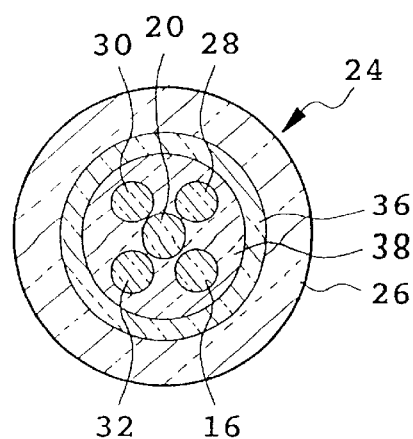
FIG. 5 is a sectional view taken along line 5—5 of FIG. 2.

A sectional view taken along line 5—5 of FIG. 2 after the heating and drawing operation is shown in FIG. 5. The optical fibers 16, 20, 28, 30 and 32 are fused to each other and covered therearound with the quartz glass film 38. The glass film 38 doped with Er and $B_2O_3$ has a refractive index lower by 0.5% than that of the clads of the optical fibers and has an Er concentration of approximately 3,000 ppm. Meanwhile, the glass film 36 doped with F has a refractive index lower by 1% than that of the clads of the optical fibers.

Signal light of a wavelength of 1.55 $\mu$m was inputted to the input port 18 of the optical fiber 16 for signal light propagation while the pumping laser diode 22 was driven to input pump light of another wavelength of 1.48 $\mu$m to the optical fiber 20 for pump light propagation. Then, while the powers of output light of the other three optical fibers 28, 30 and 32 were monitored using photodiodes, they were drawn until the output powers of them became equal to each other. As an array of the fibers in the quartz glass pipe 26, the optical fiber 20 for pump light propagation is preferably disposed at the center as shown in FIG. 5 in order to distribute the pump light uniformly.

The dimensions of the light amplification coupler 24 after the heating and drawing operation are generally such as follows: the diameters of the optical fibers 16, 20, 28, 30 and 32 at the coupling portions are approximately 10 μm; the inner diameter of the F doped glass film 36 is approximately 50 to 100 μm; the outer diameter of the quartz glass pipe 26 is approximately 200 μm to 300 μm; and the length of the quartz glass pipe 26 is approximately 70 mm to approximately 100 mm. With the light amplification coupler 24 produced in this manner, as the diameter of the fibers in the quartz glass pipe 26 decreases, propagation light in the cores which seeps out of or leaks from the fibers increases and successively couples between adjacent fibers. As a result, a mode condition wherein propagation light is distributed uniformly corresponding to a drawing amount is entered, and at a particular drawing amount, signal light is distributed substantially uniformly (reference; APPLIED OPTICS, 1990, Vol. 29, No. 3, p.371).

Figure 6:
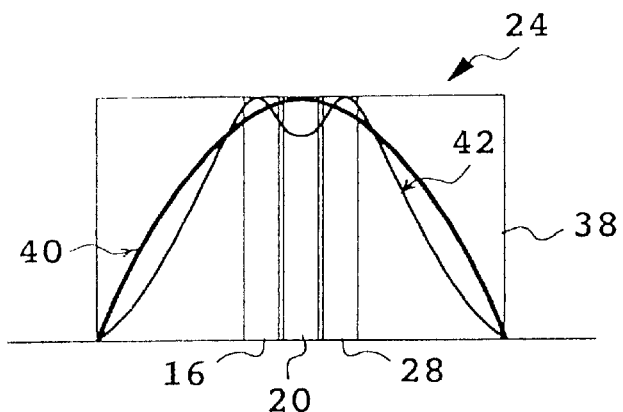
FIG. 6 is a diagram illustrating a light power distribution in the light amplification coupler.

A light power distribution in the light amplification coupler 24 is illustrated in FIG. 6. Since signal light 42 and pump light 40 spread to the amplification medium portion, that is, to the Er doped quartz glass 38 as seen in FIG. 6, an amplification action takes place in the Er doped glass 38 so that signal light is amplified. It is to be noted that the band width of the light amplification coupler 24 can be increased by doping the Er doped glass 38 with Al. In order to raise the ratio of light which passes through the Er doped glass 38 to raise the amplification efficiency, it is preferable to etch the fiber diameter after removal of the coating using hydrofluoric acid to reduce the diameter of the fiber to approximately 40 μm in advance and insert the optical fibers 16, 20, 28, 30 and 32 of such reduced diameters into the quartz glass pipe 26.

The first embodiment shown in FIG. 2 is a forward pumping type light amplification coupler. Similar effects and advantages can be achieved also with a backward pumping type light amplification coupler wherein the optical fiber 20 for pump light propagation is inserted in the quartz glass pipe 26 from the opposite direction to that of FIG. 2 and signal light and pump light are propagated in the opposite directions to each other. As seen in FIG. 2, the pumping laser diode 22 for outputting pump light of a wavelength of 1.48 μm is connected by splicing to the optical fiber 20 for pump light propagation.

Figure 7:
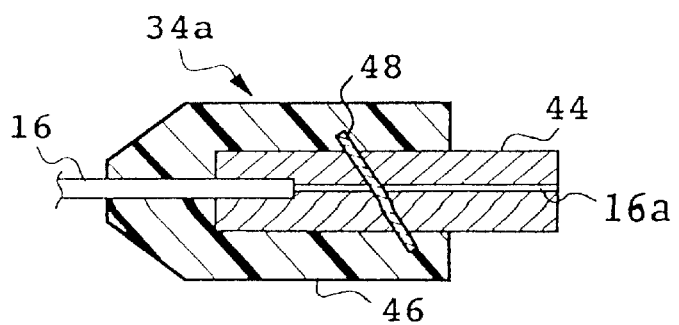
FIG. 7 is a longitudinal sectional view of an output port.

Each of the output ports 34a to 34e has such a structure as shown in FIG. 7. A bare fiber 16a whose coating has been removed is inserted in a thin center hole of a ferule 44 made of a ceramic material and secured to the ferule 44 by a bonding agent. A holder 46 made of a resin is provided on the outer side of the ferule 44. The ferule 44 has an oblique groove formed therein, and an optical filter 48 of a pass-band half-amplitude level of 5 nm for removing ASE light and a remaining component of pump light is fitted in the groove. In the light amplification coupler 24 of the present embodiment, by driving the pumping laser diode 22 with 30 mW, output light of approximately +2 to +3 dBm can be obtained at each of the output ports 34a to 34e with respect to a signal light input of −10 dBm.

Figure 8:
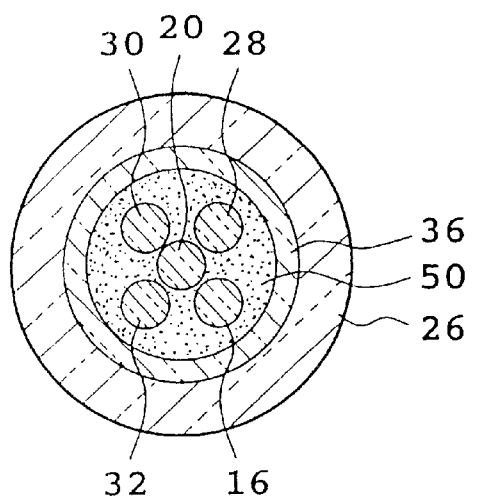
FIG. 8 is a cross sectional view illustrating a production method of a second embodiment of the present invention.

Subsequently, a production method for a light amplification coupler of a second embodiment of the present invention is described with reference to FIG. 8. Similarly as in the first embodiment described above, an F doped quartz glass film 36 is formed on the inner surface of a quartz glass pipe 26. Then, alkylsilicate glass liquid 50 doped with Er and $B_2O_3$ is filled into the quartz glass pipe 26, and the quartz glass pipe 26 is heated to approximately 200° C. to 300° C. to vitrify the alkylsilicate glass liquid. Then, heating and drawing is performed in a similar manner as in the first embodiment. By the method just described, a light amplification coupler similar to that of the first embodiment was obtained successfully.

It is to be noted that, also in the production method of the second embodiment, it is preferable to etch the coating removed portion of each optical fiber using hydrofluoric acid so that it has a diameter reduced to approximately 40 μm in advance. The band width of the light amplification coupler can be increased by doping Al into the alkylsilicate glass liquid 50.

Figure 9:
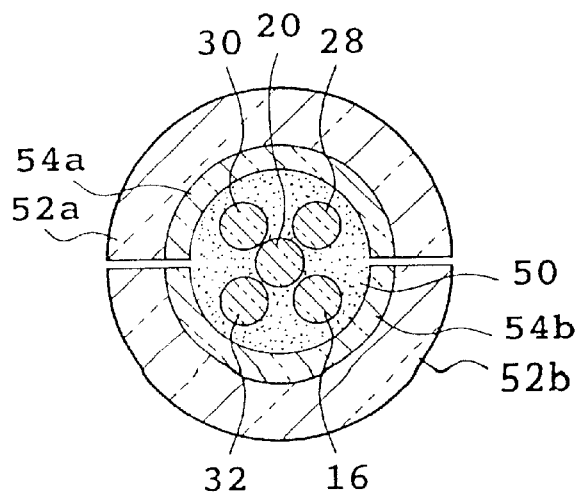
FIG. 9 is a cross sectional view illustrating a production method of a third embodiment of the present invention.

A production method for a light amplification coupler of a third embodiment of the present invention is described with reference to FIG. 9. First, five optical fibers whose coatings are removed from intermediate portions of the same are heated and drawn to fuse them to each other. The fused portions of the optical fibers are surrounded by a pair of quartz glass pipe halves 52a and 52b which have, on the inner surfaces thereof, quartz glass films 54a and 54b doped with F, respectively, and alkylsilicate glass liquid doped with Er and $B_2O_3$ is filled into the inside of the pair of quartz glass pipe halves 52a and 52b joined together.

Then, the quartz glass pipe halves 52a and 52b are heated to approximately 200° C. to 300° C. to vitrify the alkylsilicate glass liquid. Thereafter, heating and drawing is performed in a similar manner as in the first embodiment. By this method, a light amplification coupler similar to that of the first embodiment was obtained successfully. In the production method of the present embodiment, since it is required only to fit the pair of quartz glass pipe halves 52a and 52b around the fused portions of the fibers without inserting the fibers into a quartz glass pipe, a thick fiber having a coating outer diameter of 0.9 mm can be used, and handling facility can be improved.

It is to be noted that, also in the production method of the present embodiment, in order to achieve improvement in amplification efficiency, it is preferable to etch the coating removed portion of each of the fibers to reduce the diameter of the same to approximately 40 μm in advance. Further, similarly as in the second embodiment, the band width of the light amplification coupler can be increased by doping Al into the alkylsilicate glass liquid 50.

Figure 10:
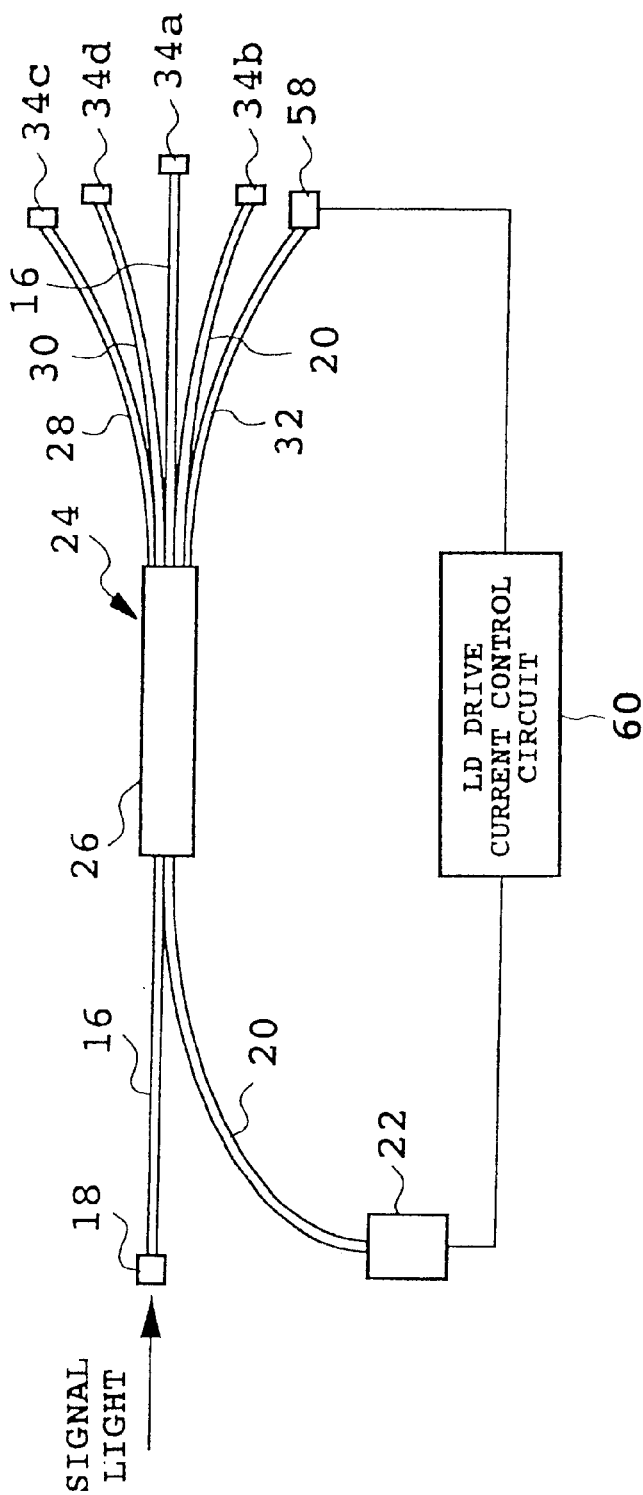
FIG. 10 is a schematic view of a light amplification coupler of a second embodiment of the present invention.

Referring to FIG. 10, there is shown a schematic view of a light amplification coupler 24 of the second embodiment of the present invention. Substantially same components as those of the first embodiment shown in FIG. 2 are denoted by same reference numerals and overlapping description thereof is omitted here to avoid redundancy. In the present embodiment, output light of an optical fiber 32 is detected by means of a photodiode 58. Further, an LD driving current control circuit 60 is provided for controlling the driving current of the pumping laser diode 22 so that the output current from the photodiode 58 may be fixed. Due to this construction, the power of the output light was successfully controlled within the range of ±0.2 dB.

Figure 11:
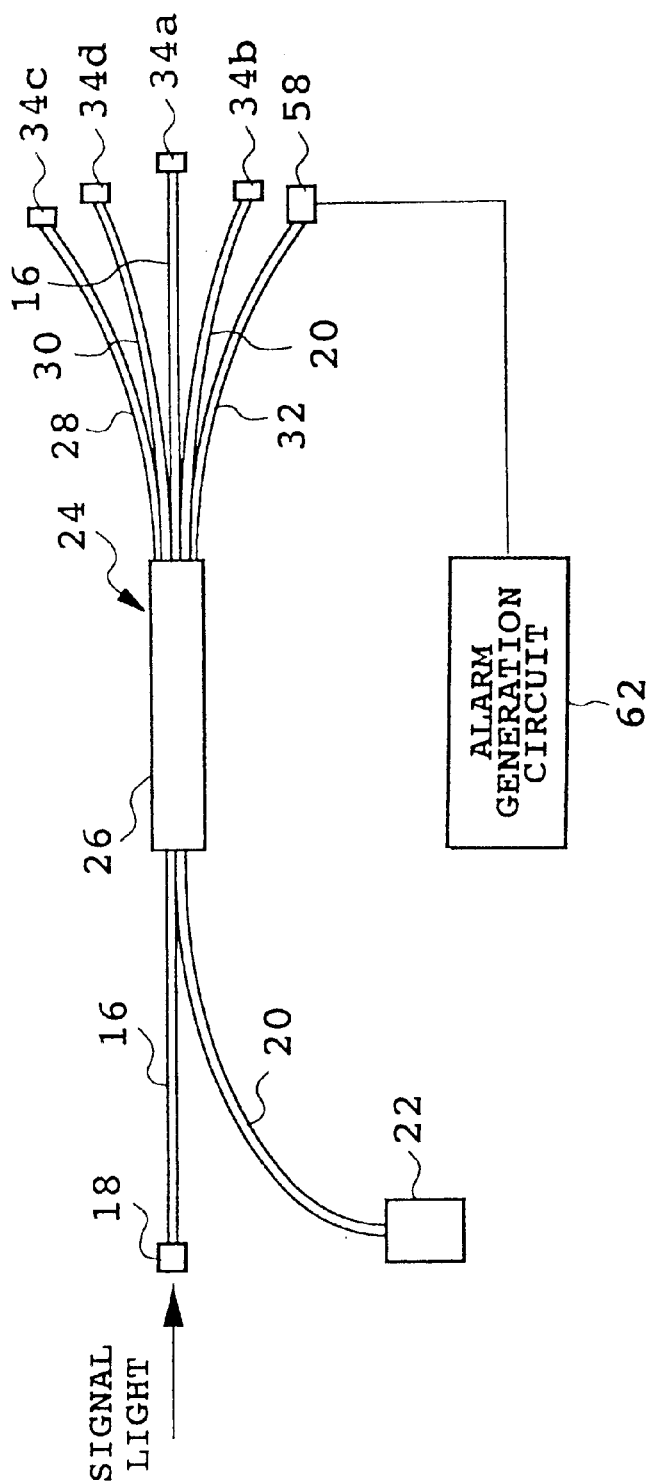
FIG. 11 is a schematic view of a light amplification coupler of a third embodiment of the present invention.

Referring to FIG. 11, there is shown a light amplification coupler of the third embodiment of the present invention. In the present embodiment, output light of an optical fiber 32 is detected by means of a photodiode 58, and an alarm generation circuit 62 is connected to the photodiode 58. In the present embodiment, output current of the photodiode 58 is monitored to detect an abnormal state, and if an abnormal state is detected, then the alarm generation circuit 62 outputs an alarm signal. The abnormal state to be detected includes an abnormal state that no signal light is propagated or the level of signal light is lower than a predetermined level.

It is to be noted that, while the embodiments described above are constructed such that Er is doped as light amplification medium, some other rare earth element such as Nd, Pr or Tm may alternatively be adopted for the light amplification medium. According to the present invention, since a fusion type coupler can be provided with a branching function and an amplification function simultaneously and besides those function elements can be produced collectively, the present invention is advantageous in that a less expensive integrated type light amplification coupler can be provided.

What is claimed is:

1. An optical fiber assembly, comprising:
    a glass pipe;
    a plurality of optical fibers inserted in said glass pipe and fused to each other; and
    a rare earth doped light amplification medium fused to both of said glass pipe and said fused optical fibers in such a manner as to cover an outer periphery of said optical fibers fused in said glass pipe.

2. An optical fiber assembly according to claim 1, wherein said rare earth doped light amplification medium contains an element selected from the group consisting of Er, Nd, Pr and Tm.

3. An optical fiber assembly according to claim 1, wherein said rare earth doped light amplification medium contains Er and B and has a refractive index lower than that of clads of said plurality of optical fibers.

4. An optical fiber assembly according to claim 3, further comprising a glass film doped with F interposed between said glass pipe and said rare earth doped light amplification medium.

5. An optical fiber assembly according to claim 3, wherein said rare earth doped light amplification medium further contains Al.

6. A light amplification coupler, comprising:
    a glass pipe;
    a first optical fiber having, at one end thereof, an input port to which signal light is inputted and having an output port at the other end thereof, said first optical fiber having an intermediate portion inserted in said glass pipe;
    a second optical fiber having one end portion adapted to receive pump light, said second optical fiber being inserted in said glass pipe and fused to said first optical fiber;
    a third optical fiber having an output port at one end thereof, the other end of said third optical fiber being inserted in said glass pipe from the output port side of said first optical fiber and fused to said first and second optical fibers; and
    a rare earth doped light amplification medium fused to all of said glass pipe and said first, second and third optical fibers in such a manner as to cover said first, second and third optical fibers fused in said glass pipe.

7. A light amplification coupler according to claim 7, wherein said rare earth doped light amplification medium contains an element selected from the group consisting of Er, Nd, Pr and Tm.

8. A light amplification coupler according to claim 6, wherein said rare earth doped light amplification medium contains Er and has a refractive index lower than that of clads of said first to third optical fibers.

9. An amplification coupler according to claim 8, wherein said rare earth doped light amplification medium contains B.

10. A light amplification coupler according to claim 9, wherein said rare earth doped light amplification medium further contains Al.

11. A light amplification coupler according to claim 9, further comprising a glass film doped with F interposed between said glass pipe and said rare earth doped light amplification medium.

12. A light amplification coupler according to claim 6, wherein said third optical fiber is composed of a plurality of optical fibers, and said second optical fiber is disposed at the center of said first optical fiber and said plurality of third optical fibers.

13. A light amplification coupler according to claim 6, wherein
    the pump light causes the signal light to be amplified, components of pump light remaining after amplification of the signal light, and
    each of the output ports of said first optical fiber and said third optical fiber has an optical filter for removing amplified spontaneous emission (ASE) light and a remaining component of pump light.

14. A light amplification coupler according to claim 6, further comprising:
    a pump light source for inputting pump light to the one end portion of said second optical fiber;
    a photo-detector for receiving light from one of the output ports; and
    control means connected to said pump light source and said photo-detector for controlling the power of light detected by said photo-detector to be fixed.

15. A light amplification coupler according to claim 6, further comprising:
    a photo-detector for receiving light from one of the output ports; and
    alarm generation means connected to said photo-detector for monitoring output current of said photo-detector to detect an abnormal state depending upon the output current and outputting an alarm signal when an abnormal state is detected.

16. A light amplification coupler, comprising:
    a glass pipe;
    a plurality of optical fibers each having an input port at one end thereof and having an output port at the other end thereof, said optical fibers being inserted in said glass pipe and fused to each other; and
    a rare earth doped light amplification medium provided around said plurality of optical fibers fused in said glass pipe;
    wherein a signal light to be amplified is inputted to the input port of one of said plurality of optical fibers while a pump light is inputted to the input port of at least one of said plurality of optical fibers other than the optical fiber to which the signal light is inputted.

17. A method of producing an optical fiber assembly, comprising the steps of:
    forming a rare earth doped light amplification medium quartz glass film on an inner surface of a quartz glass pipe;
    partially removing coatings of a plurality of optical fibers individually;
    inserting said plurality of optical fibers into said quartz glass pipe such that the portions of said plurality of optical fibers from which the coatings have been removed may be positioned in said quartz glass pipe; and
    heating and drawing said plurality of optical fibers together with said quartz glass pipe to fuse said plurality of said optical fibers and said quartz glass pipe to each other and covering an outer periphery of said plurality of optical fibers with a fused rare earth doped light amplification medium.

18. A method of producing an optical fiber assembly according to claim 17, further comprising the step of forming, prior to the formation of said rare earth doped light amplification medium quartz glass film, a quartz glass film doped with F on the inner surface of said quartz glass pipe.

19. A method of producing an optical fiber assembly according to claim 18, wherein said rare earth doped light amplification medium quartz glass film is formed from a quartz glass film doped with Er and $B_2O_3$.

20. A method of producing an optical fiber assembly according to claim 17, further comprising the step of reducing the diameters of the coating-removed portions of said plurality of optical fibers by etching.

21. A method of producing an optical fiber assembly, comprising the steps of:
    partially removing coatings of a plurality of optical fibers;
    inserting said plurality of optical fibers into a quartz glass pipe such that the portions of said plurality of optical fibers from which the coatings have been removed may be positioned in said quartz glass pipe;
    filling alkylsilicate glass liquid doped with a rare earth element into said quartz glass pipe;
    heating said alkylsilicate glass liquid so as to be vitrified; and
    heating and drawing said plurality of optical fibers together with said quartz glass pipe and the alkylsilicate glass to fuse said plurality of optical fibers, said alkylsilicate glass and said quartz glass pipe to each other and covering an outer periphery of said plurality of optical fibers with fused rare earth doped alkylsilicate glass.

22. A method of producing an optical fiber assembly according to claim 21, further comprising the step of forming a quartz glass film doped with F on the inner surface of said quartz glass pipe.

23. A method of producing an optical fiber assembly according to claim 21, further comprising the step of reducing the diameters of the coating-removed portions of said plurality of optical fibers by etching.

24. A method of producing an optical fiber assembly, comprising the steps of:
    partially removing coatings of a plurality of optical fibers;
    fusing said plurality of optical fibers to each other at the portions of the same from which the coatings have been removed and drawing said plurality of optical fibers;
    holding said plurality of fused and drawn optical fibers at the fused and drawn portions between and by a pair of quartz glass pipe halves;
    filling alkylsilicate glass liquid doped with a rare earth element into the inside of said pair of quartz glass pipe halves;
    heating said alkylsilicate glass liquid so as to be vitrified; and
    heating and drawing said plurality of fused optical fibers together with said pair of quartz glass pipe halves and the alkylsilicate glass to fuse said plurality of fused optical fibers, said alkylsilicate glass and said pair of quartz glass pipe halves to each other and covering an outer periphery of said plurality of optical fibers with fused rare earth doped alkylsilicate glass.

25. A method of producing an optical fiber assembly according to claim 24, further comprising the step of forming a quartz glass film doped with F on inner surfaces of said pair of quartz glass pipe halves.

26. A method of producing an optical fiber assembly according to claim 24, further comprising the step of reducing the diameters of the coating-removed portions of said plurality of optical fibers by etching.

* * * * *

UNITED STATES PATENT AND TRADEMARK OFFICE
CERTIFICATE OF CORRECTION

PATENT NO.    : 6,217,204 B1
DATED         : April 17, 2001
INVENTOR(S)   : Tadao Aima It is certified that error appears in the above-identified patent and that said Letters Patent is hereby corrected as shown below:

Claim 7,
Change "according to claim 7" to -- according to claim 6 --.

Signed and Sealed this

Thirtieth Day of October, 2001

Attest:

NICHOLAS P. GODICI
Attesting Officer    Acting Director of the United States Patent and Trademark Office